(12) United States Patent
Furick

(10) Patent No.: US 12,397,382 B2
(45) Date of Patent: Aug. 26, 2025

(54) MODULAR WELDING POSITIONER

(71) Applicant: Michael Furick, Mooresville, NC (US)

(72) Inventor: Michael Furick, Mooresville, NC (US)

( * ) Notice: Subject to any disclaimer, the term of this patent is extended or adjusted under 35 U.S.C. 154(b) by 150 days.

(21) Appl. No.: 18/463,432

(22) Filed: Sep. 8, 2023

(65) Prior Publication Data
US 2025/0083266 A1    Mar. 13, 2025

(51) Int. Cl.
*B23K 37/00* (2025.01)
*B23K 37/04* (2006.01)
*B23K 37/047* (2006.01)

(52) U.S. Cl.
CPC ........ *B23K 37/0452* (2013.01); *B23K 37/047* (2013.01)

(58) Field of Classification Search
CPC .............. B23K 37/0452; B23K 37/047; B23K 37/0443; B23K 37/04–0538
USPC ................................................ 228/47.1–49.6
See application file for complete search history.

(56) References Cited

FOREIGN PATENT DOCUMENTS

| CN | 103949841 A | * | 7/2014 | ............. B23K 37/00 |
| CN | 104384804 A | * | 3/2015 | ............. B23K 26/24 |
| CN | 104607839 A | * | 5/2015 | ......... B23K 37/0443 |
| CN | 105904148 A | * | 8/2016 | |
| CN | 110293359 A | * | 10/2019 | |
| CN | 113042968 A | * | 6/2021 | ............. B23K 37/00 |
| CN | 113369779 A | * | 9/2021 | |
| CN | 113770616 A | * | 12/2021 | |
| CN | 114043157 A | * | 2/2022 | ........... B23K 37/047 |
| CN | 114083203 A | * | 2/2022 | ............. B23K 37/00 |
| CN | 114434081 A | * | 5/2022 | |
| CN | 114535923 A | * | 5/2022 | |
| CN | 114951929 A | * | 8/2022 | |
| CN | 116079328 A | * | 5/2023 | |
| CN | 116275721 A | * | 6/2023 | |
| CN | 116352351 A | * | 6/2023 | |
| CN | 116921940 A | * | 10/2023 | |
| CN | 117245291 A | * | 12/2023 | |
| CN | 110560949 B | * | 5/2024 | ............. B23K 31/02 |
| KR | 102049229 B1 | * | 11/2019 | |

* cited by examiner

*Primary Examiner* — Kiley S Stoner
(74) *Attorney, Agent, or Firm* — Shumaker, Loop & Kendrick, LLP; Brandon C. Trego

(57) ABSTRACT

A modular welding positioner is disclosed. The modular welding positioner includes a base, the base including: spaced-apart guides positioned thereon, the guides being arranged so as to define both a circular path and a linear path; and a driving element to move a positioner positioned on the base.

19 Claims, 11 Drawing Sheets

MODULAR WELDING POSITIONER

BACKGROUND OF THE INVENTION

This invention relates generally to a welding apparatus, and more particularly to a modular welding positioner for use in a welding process.

Welding positioners are well-known in the welding industry. Welding positioners allow a user to secure a device to the welding positioner and perform a weld. For example, a lot of the welding positioners are rotary positioners to allow a user to clamp a workpiece thereto and perform a circumferential weld. By having a uniform rotation of the workpiece, the user is able to provide a uniform and strong weld around the circumference of the workpiece. Another type of welding positioner is a linear positioner.

Unfortunately, not all welding is performed either circumferentially or linearly and as a result, users are required to buy multiple welding positioners to perform a single welding job.

Accordingly, there is a need for a welding positioner that allows a user to perform both linear and circumferential welds using a single welding positioner.

BRIEF SUMMARY OF THE INVENTION

This need is addressed by the present invention, which provides a modular welding positioner that allows a user to perform both linear and circumferential welds.

According to an aspect of the invention, a modular welding positioner includes a base, the base including: spaced-apart guides positioned thereon, the guides being arranged so as to define both a circular path and a linear path; and a driving element to move a positioner positioned on the base.

According to another aspect of the invention, a modular welding positioner includes a rotary positioner configured to rotate an object to be welded; a linear positioner configured to move linearly an object to be welded; and a base having a plurality of guides positioned thereon for receiving one of the rotary positioner or linear positioner; wherein the modular welding positioner is configurable between a first configuration where the rotary positioner is positioned between the guides on the base and a second configuration where the linear positioner is positioned between the guides on the base.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
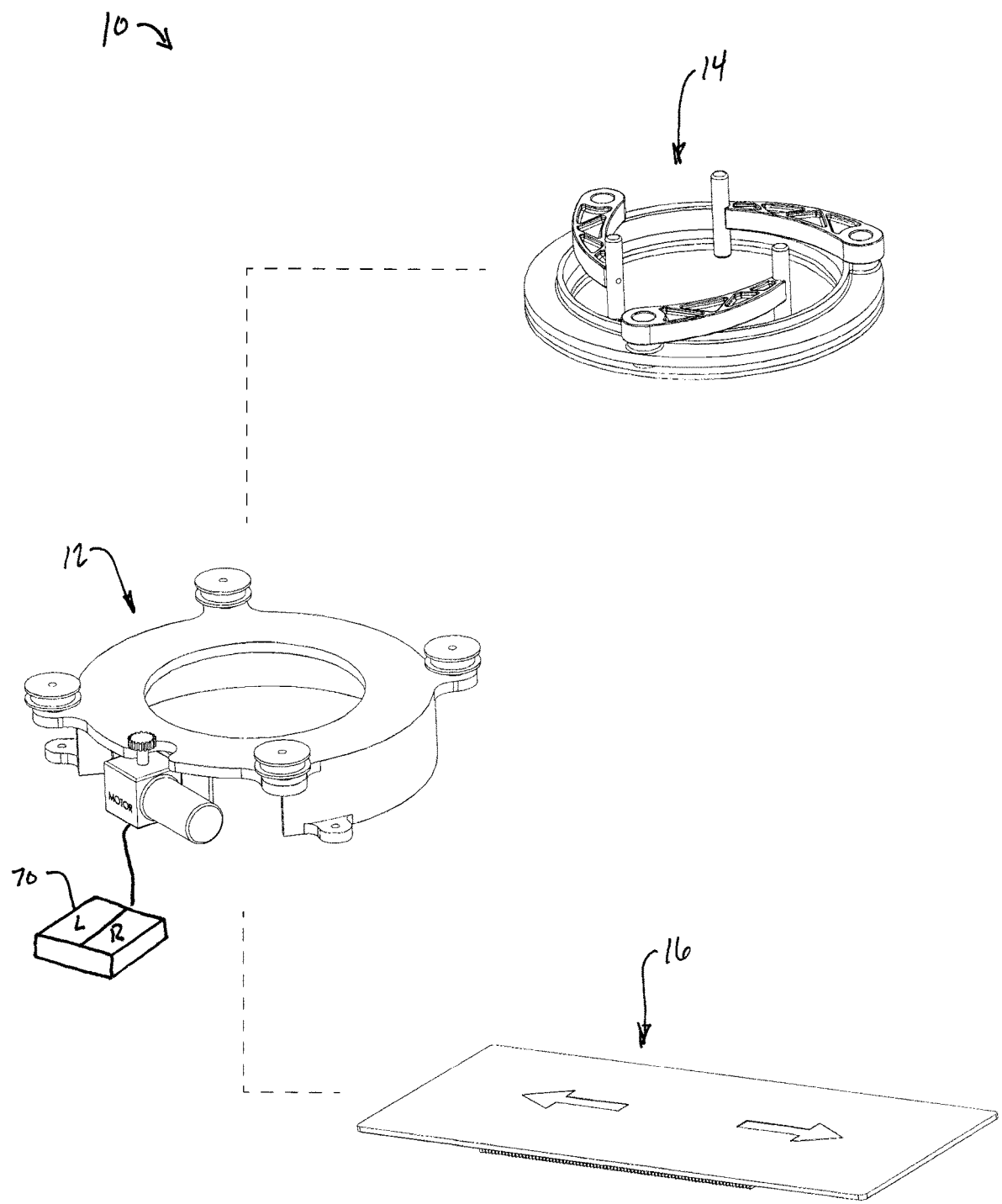
FIG. 1 shows a modular welding positioner according to an embodiment of the invention.

Referring to the drawings wherein identical reference numerals denote the same elements throughout the various views, FIG. 1 illustrates an exemplary modular welding positioner 10. The modular welding positioner 10 includes a base 12, a rotary positioner 14, and a linear positioner 16.

Figure 2:
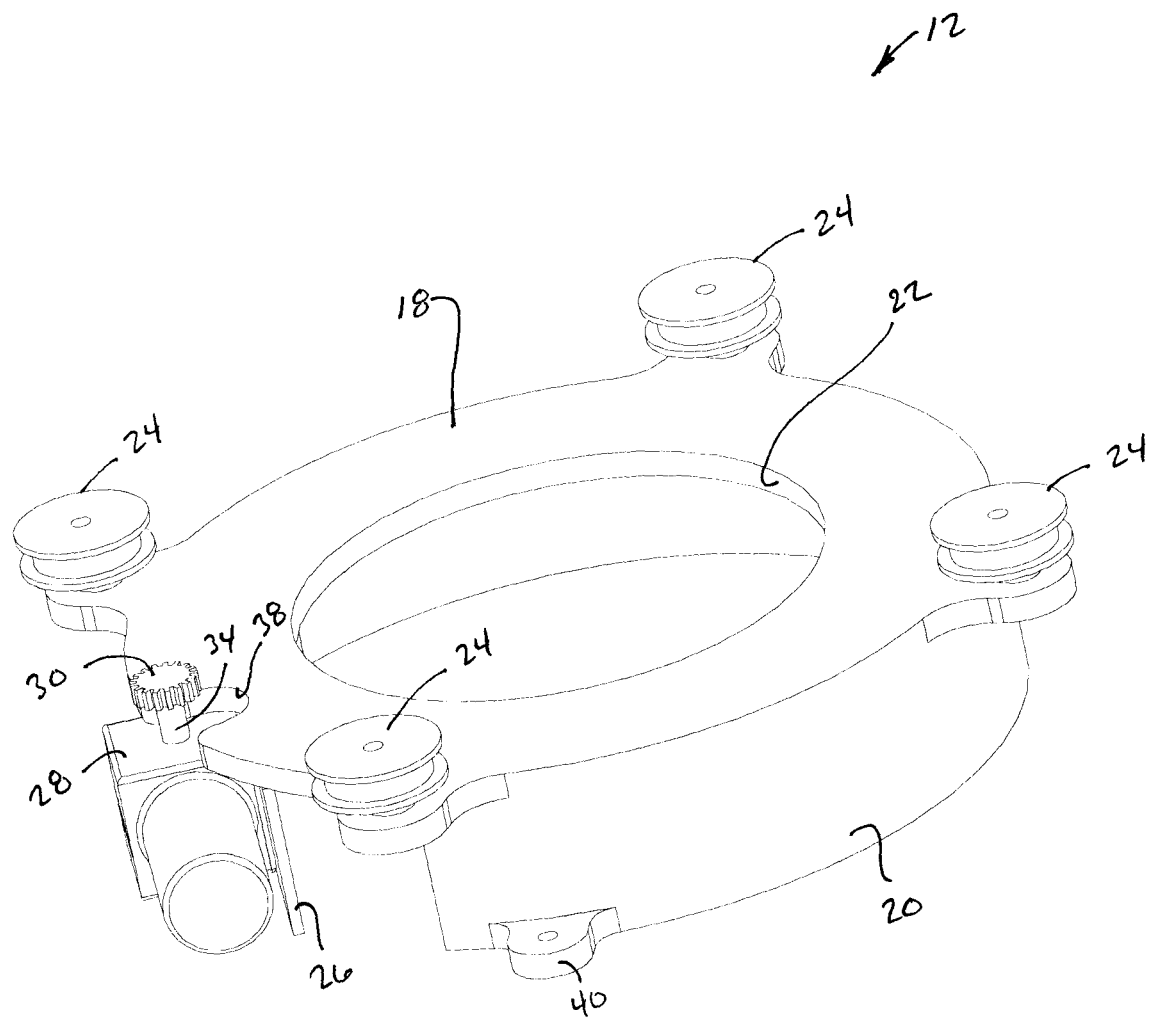
FIG. 2 shows a base of the modular welding positioner of FIG. 1.
Figure 3:
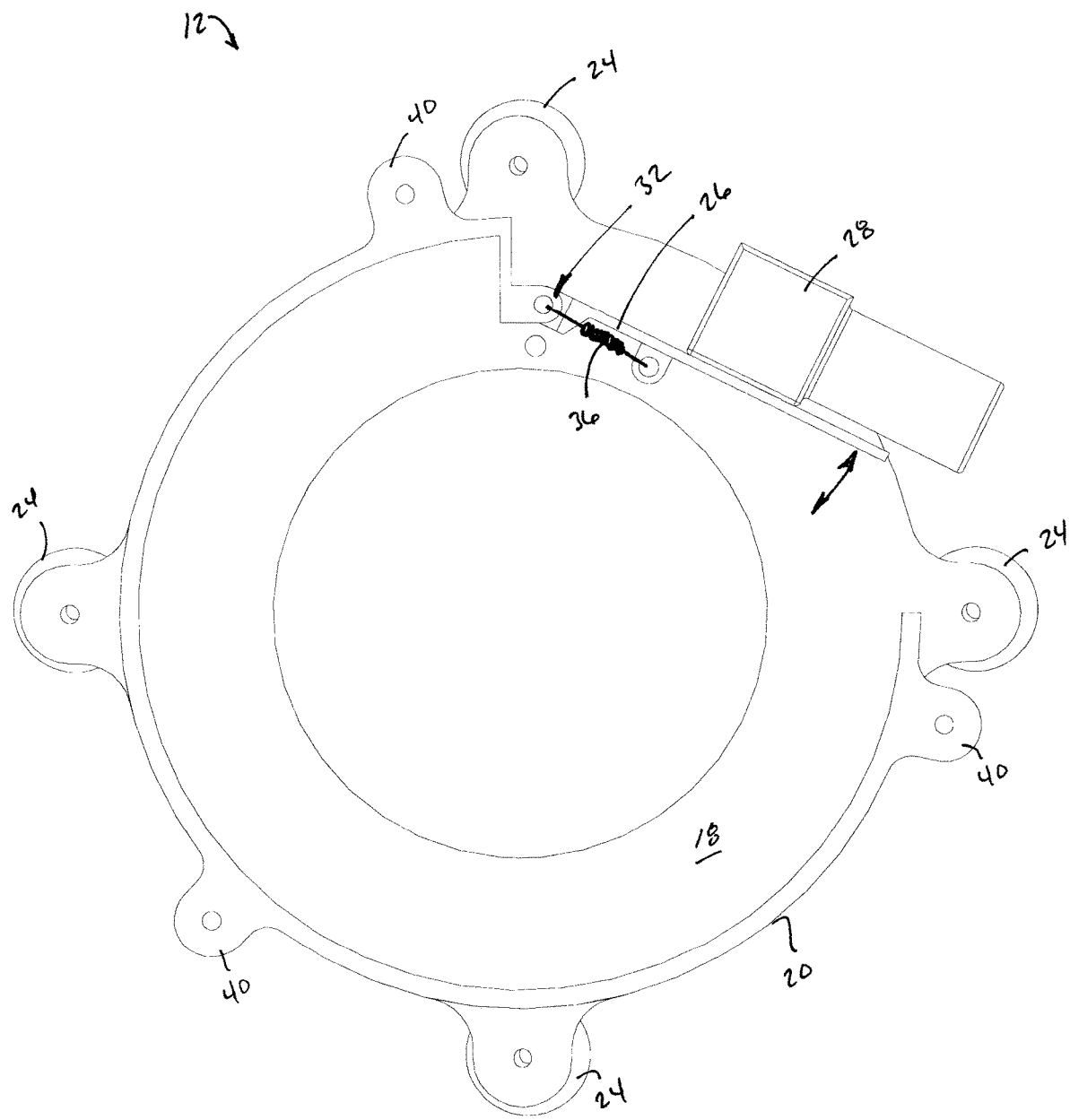
FIG. 3 shows a bottom view of the base of FIG. 2.
Figure 4:
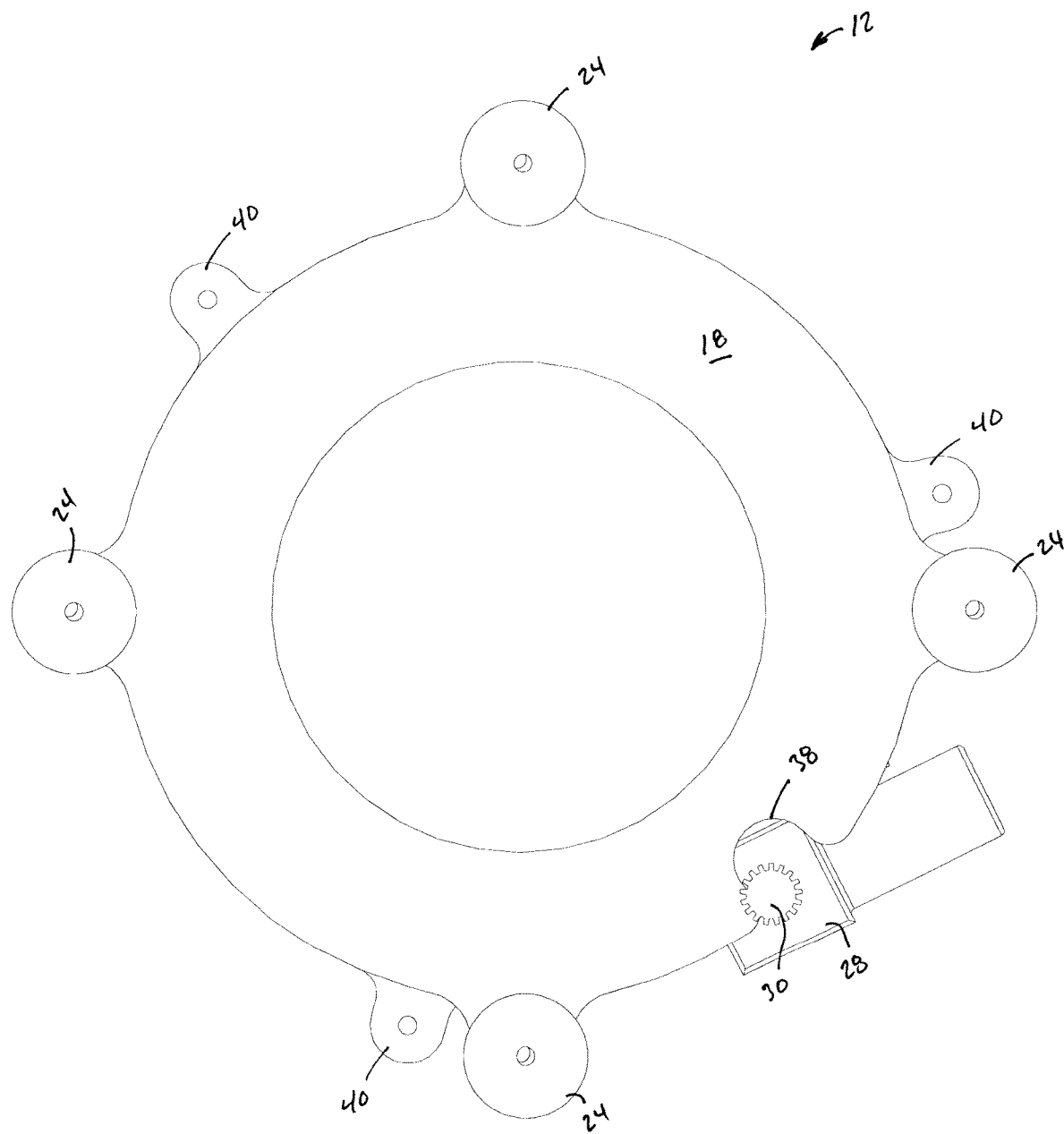
FIG. 4 shows a top view of the base of FIG. 2.
Figure 5:
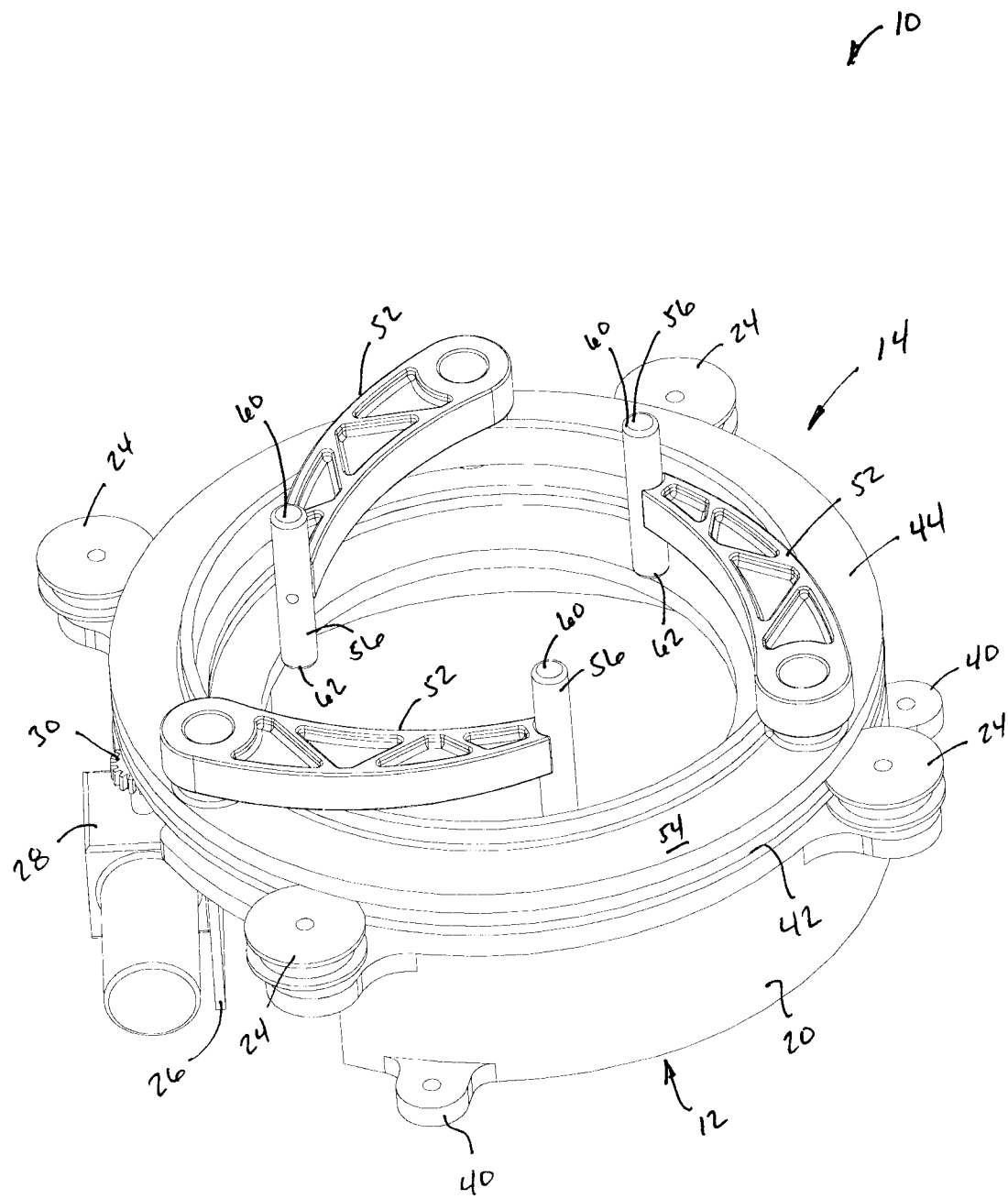
FIG. 5 shows a first configuration of the welding positioner of FIG. 1.
Figure 6:
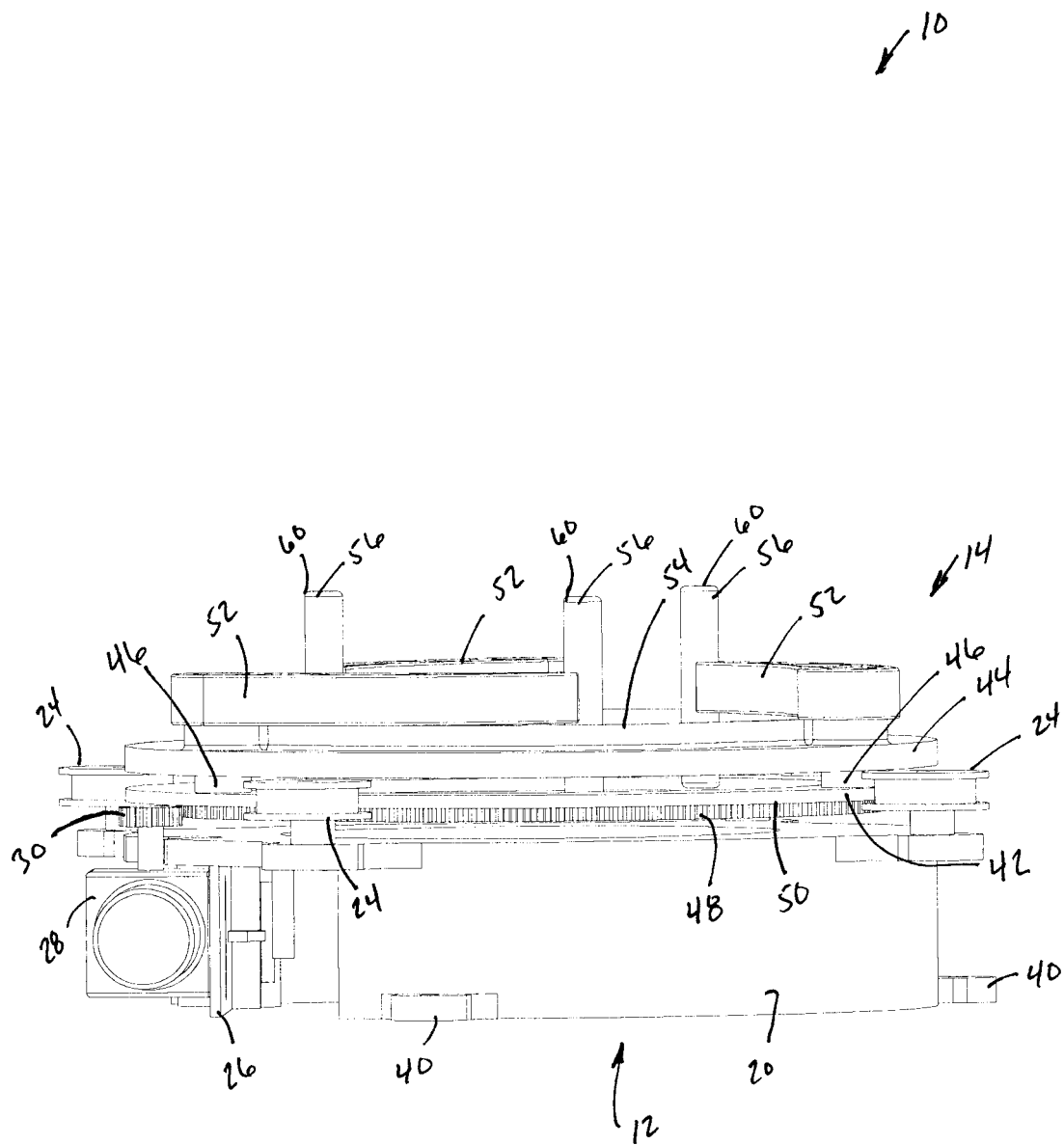
FIG. 6 shows a side elevation of the welding positioner of FIG. 5.

As shown in FIGS. 2-4, the base 12 includes an upper platform 18 supported by a sidewall 20. The platform 18 is in the form of a ring, i.e., the platform 18 includes an aperture 22 extending therethrough. Guides 24 are spaced along a periphery of the platform 18 for receiving the rotary poisoner 14 or linear positioner 16 therebetween. As shown, four guides 24 are equally spaced along a periphery of the platform 18; however, it should be appreciated that any suitable combination of guides 24 and spacing may be used. Further, it should be appreciated that the guides 24 may act as stationary guides (i.e., do not rotate) or as rollers (i.e., rotate). The guides 24 may be made of any suitable material such as plastic (for example, polytetrafluoroethylene (PTFE)), metal (for example, aluminum and steel) and a friction material such as rubber.

The base further includes a gate 26 pivotally connected to the sidewall 20 at hinge 32. Any suitable hinge or pivot may be used to allow the gate 26 to pivot relative to the sidewall 20. The gate 26 supports a motor 28 used to operate a driving element such as gear 30. It should be appreciated that a friction element may also be considered a gear. One example of a motor is a step motor; however, it should be appreciated that any suitable motor may be used to operate gear 30. The gate 26 pivots between a use position where the gear 30 is engaged with a gear (discussed below) of the rotary positioner 14 or of the linear position 16 and a non-use position where the gear 30 is no longer engaged. The platform 18 includes a cutout or slot 38 to allow a shaft 34 of the gear 30 to move inwardly toward a center of the platform 18 when the gate 26 is moved to the use position. A spring 36 biases the gate 26 in the use position. Base mounts 40 extend from the sidewall to allow the base to be secured to a table or other device using fasteners such as bolts.

Referring to FIGS. 5-8, the modular welding positioner 10 is shown in a first configuration using the rotary positioner 14. The rotary positioner 14 is positioned and secured between the guides 24 to permit the rotary positioner 14 to rotate. The rotary positioner 14 includes first and second spaced-apart rings 42 and 44 connected in a stacked configuration by spacers 46 positioned therebetween, a ring gear 48 connected to a bottom 50 of the first ring 42, and arms 52 pivotally connected to a top 54 of the second ring 44. As shown, the rotary positioner 14 includes three arms 52; however, it should be appreciated that any suitable number of arms 52 may be used.

Figure 7:
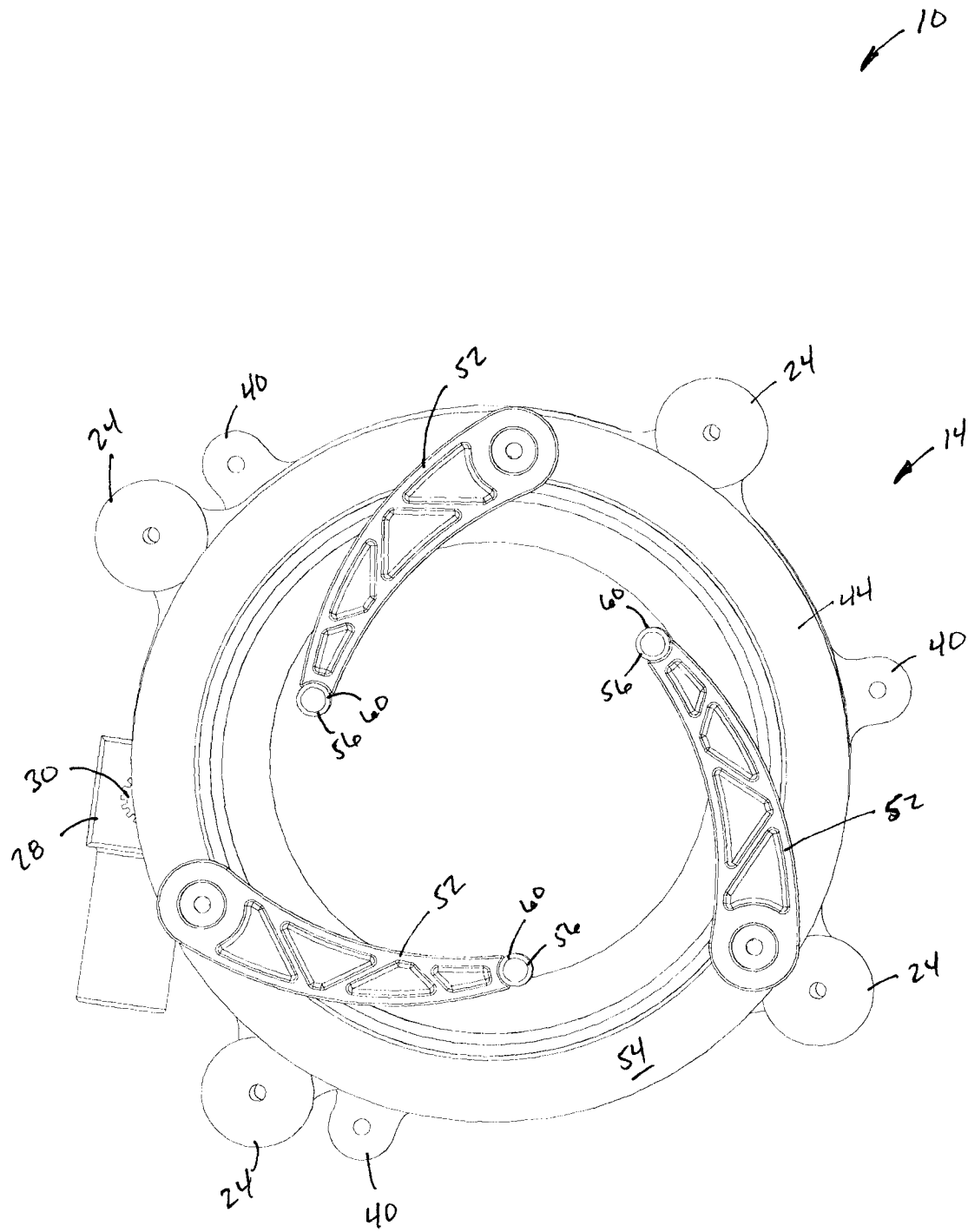
FIG. 7 shows a top view of the welding positioner of FIG. 5 with jaws in a first position.
Figure 8:
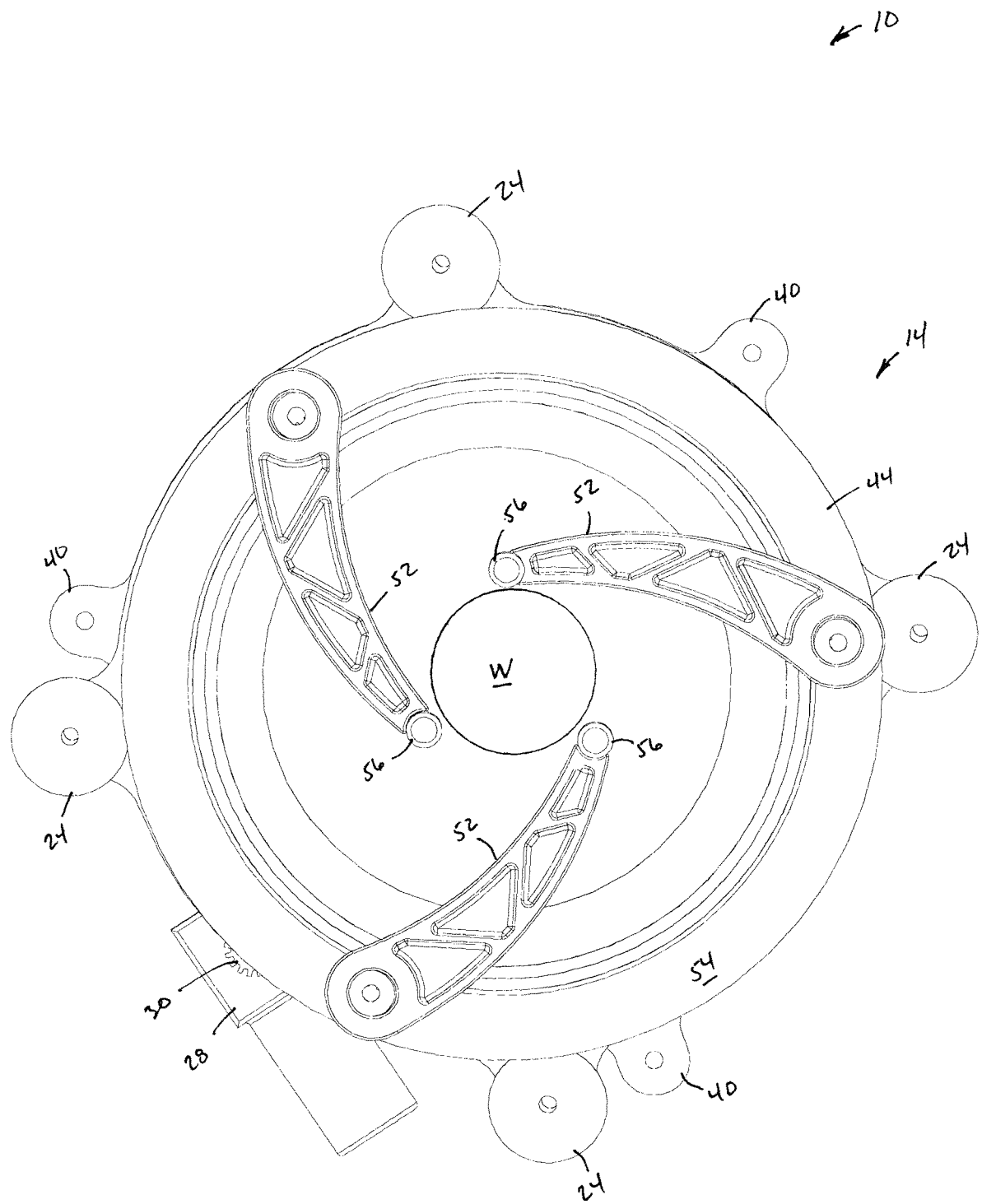
FIG. 8 shows a top view of the welding positioner of FIG. 5 with jaws in a second position.

Each of the arms 52 include a jaw 56 positioned at a distal end of the arm 52 to clamp onto a workpiece being welded. As shown, the jaws 56 are in the form of an elongated pin or cylinder with first and second ends 60 and 62 that extend above and below the arms 52. It should be appreciated that any suitable type of jaw may be used. This permits the jaws 56 to be used to clamp a workpiece "W" between the jaws 56 on an outside of the workpiece or to clamp a workpiece on an inside of the workpiece by moving the arms 52 outwardly and exerting pressure along an inside surface of a wall of the workpiece. As shown in FIGS. 7 and 8, the arms pivot about pivot points 58 to allow the jaws 56 to clamp and hold a workpiece of varying diameters and/or dimensions.

Once a workpiece is clamped by the jaws 56, the gear 30 engages ring gear 48 and the motor 28 is turned on to rotate the gear 30. This in turn rotates the rotary positioner 14 and workpiece clamped by the jaws 56 to allow a welder to apply a weld circumferentially around the workpiece. Alternatively, one or more of the guides 24 may be motorized to act as a driving element to drive and/or rotate the rotary positioner 14 instead of using gear 30.

Figure 9:
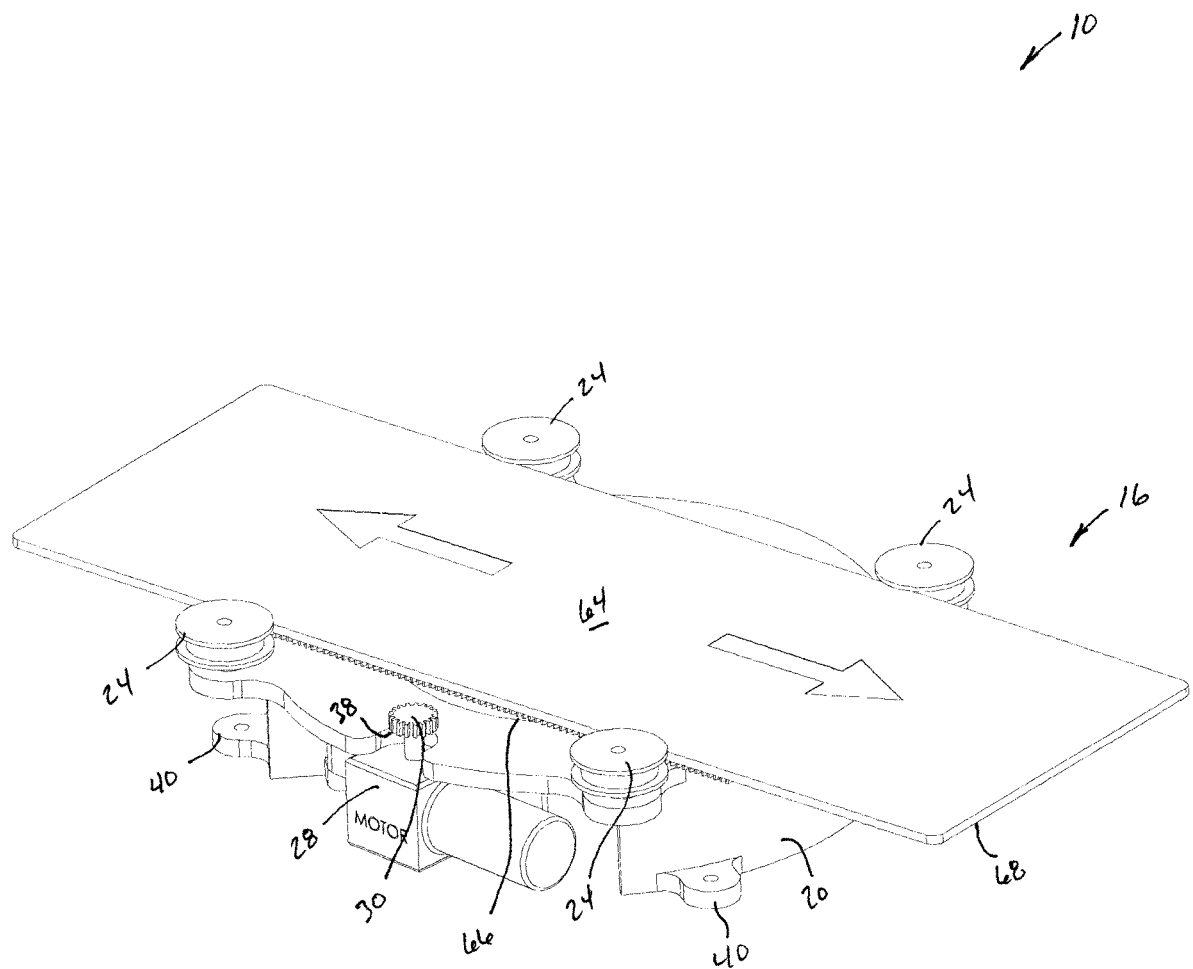
FIG. 9 shows a second configuration of the welding positioner of FIG. 1.
Figure 10:
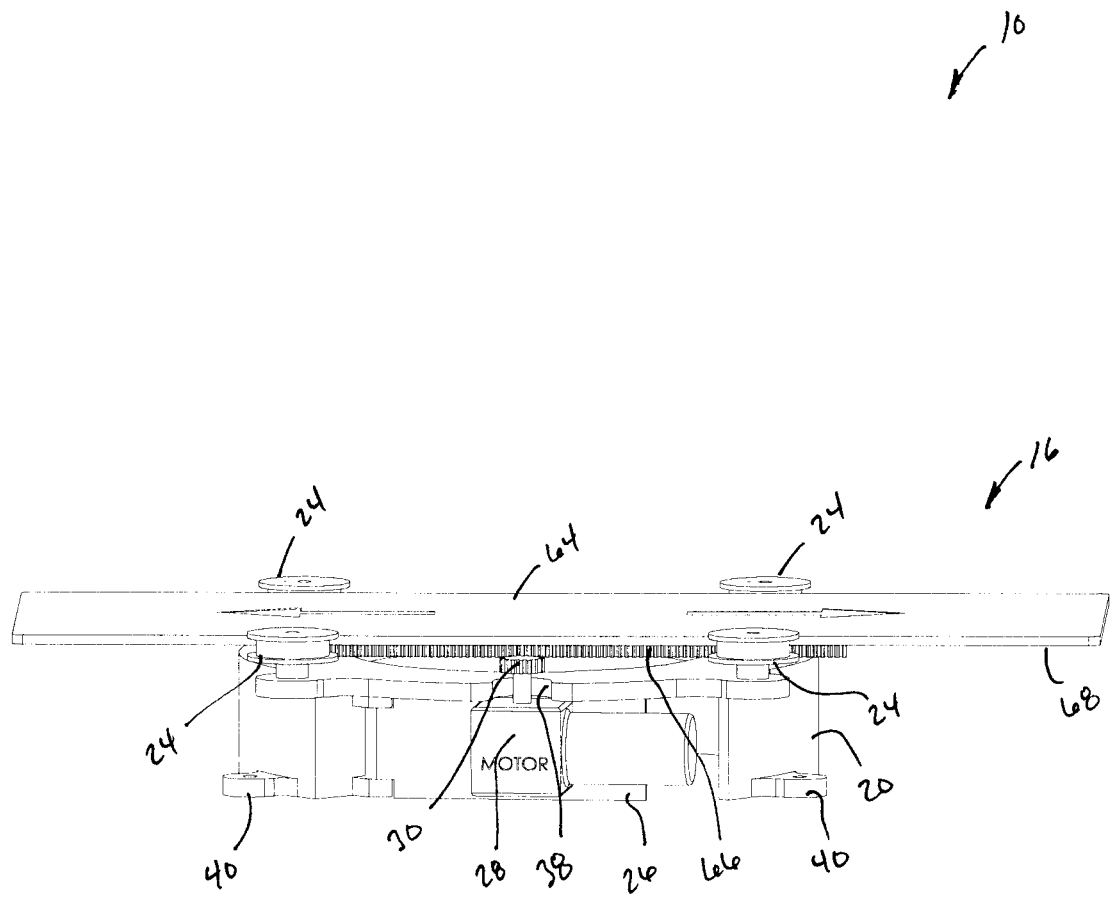
FIG. 10 shows a perspective view of the welding positioner of FIG. 9.
Figure 11:
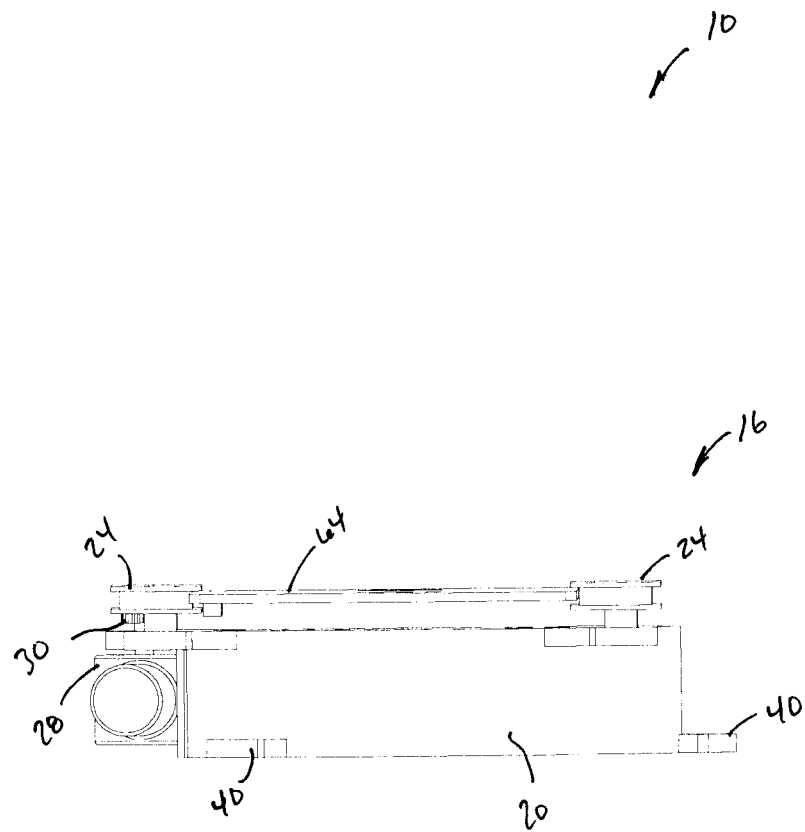
FIG. 11 shows a side elevation of the welding positioner of FIG. 9.

Referring to FIGS. 9-11, the modular welding positioner 10 is shown in a second configuration using the linear positioner 16. The linear positioner 16 is positioned and secured between the guides 24 to permit the linear positioner 16 to move linearly therebetween. The linear positioner 16 includes a table 64 and a rack gear 66 connected to a bottom 68 of the table 64. The table 64 is able to translate linearly between a first direction and a second direction (as indicated by arrows). In use, a welder places a workpiece on the table 64 and applies a linear weld to the workpiece by moving the table.

The modular welding positioner allows a welder to switch between rotary and linear welding by swapping out the positioners 14, 16. For example, a welder may want to weld a tank by first welding a sidewall of the tank and then welding end caps to the sidewall. In this example, the welder would first install the linear positioner 16 onto the base 12. The linear positioner 16 would be positioned between the guides 24 so that the table 64 can move linearly. The gear 30 would then be placed into engagement with rack gear 66. Alternatively, one or more of the guides 24 may be motorized to act as a driving element to drive and/or move the linear positioner 16 instead of using gear 30. The welder then places a tubular sheet onto the table 64 so that a linear weld can be made between opposing ends of the sheet. The welder begins the weld and controls the speed and direction of the table 64 so that the tubular sheet moves as the weld is being performed as opposed to the welder moving. The direction and speed may be controlled by a controller 70, such as a foot pedal. Additionally, the linear movement may be continuous or stepped.

Once the linear weld is complete, the welder removes the linear positioner 16 from the base and installs the rotary positioner 14. Gear 30 engages ring gear 48. The welded tube is placed between the jaws 56 and the arms 52 are rotated until the jaws 56 clamp the welded tube therebetween. It should be appreciated that the arms may be manually rotated or automatically rotated by a motor driving gears, linkages, cables, etc.

The end cap is then placed on the end of the welded tube and the welder initiates welding. The welder rotates the welded tube and cap using the controller 70 which causes the gear 30 to rotate thereby causing the rotary positioner 14 and welded tube to rotate. As stated earlier, the welder can control the speed and rotation direction of the welding positioner 14. Additionally, the rotation may be continuous or stepped. Once the cap is welded to the welded sheet, the welder disengages the jaws 56 from the welded tube and the welded tube and cap are flipped over to allow a cap to be welded to the opposing end of the welded tube. The welding process is repeated and the a tank is now formed.

The foregoing has described a modular welding positioner. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A modular welding positioner, comprising:
   a rotary positioner;
   a base, the rotary positioner being positioned on the base, the base including:
   spaced-apart guides positioned thereon, the guides being arranged so as to define both a circular path and a linear path, the rotary positioner being secured between the spaced-apart guides and adapted to rotate therebetween; and
   a driving element to move the rotary positioner positioned on the base.

2. The modular welding positioner according to claim 1, wherein the driving element is a gear configured to engage a mating gear on the rotary positioner.

3. The modular welding positioner according to claim 2, wherein the base further includes a gate, the gate being pivotally connected to a sidewall of the base to allow the gear to engage and disengage the mating gear of the rotary positioner.

4. The modular welding positioner according to claim 1, wherein the driving element is at least one of the spaced-apart guides.

5. The modular welding positioner according to claim 1, wherein the rotary positioner further includes a plurality of arms, each of the arms including a jaw positioned at a distal end thereof to clamp a workpiece in the rotary positioner.

6. The modular welding positioner according to claim 5, wherein each of the plurality of arms are pivotally connected to the rotary positioner to allow the plurality of arms to move between a clamped position and an unclamped position.

7. A modular welding positioner, comprising:
   a rotary positioner configured to rotate an object to be welded;
   a linear positioner configured to move linearly an object to be welded;
   a base having a plurality of guides positioned thereon for receiving one of the rotary positioner or linear positioner;
   a driving element to drive either of the rotary positioner or linear positioner; and
   wherein the modular welding positioner is configurable between a first configuration where the rotary positioner is positioned between the guides on the base and a second configuration where the linear positioner is positioned between the guides on the base.

8. The modular welding positioner according to claim 7, wherein the base includes:

a sidewall;

a platform supported by the sidewall, wherein the plurality of guides are spaced along a periphery of the platform; and a gate pivotally connected to the sidewall, wherein the driving element is connected to the gate.

9. The modular welding positioner according to claim 7, wherein in the first configuration, the rotary positioner is rotated between the plurality of guides by the driving element.

10. The modular welding positioner according to claim 7, wherein the rotary positioner includes a plurality of arms pivotally connected to the rotary positioner, each of the arms including a jaw positioned at a distal end of thereof to clamp a workpiece in the rotary positioner.

11. The modular welding positioner according to claim 7, wherein in the second configuration, the linear positioner is moved linearly between the plurality of guides by the driving element.

12. The modular welding positioner according to claim 7, wherein the driving element is a gear configured to engage a mating gear of either the rotary positioner or linear positioner.

13. The modular welding positioner according to claim 12, wherein the base further includes a gate, the gate being pivotally connected to a sidewall of the base to allow the gear to engage and disengage the mating gear.

14. The modular welding positioner according to claim 7, wherein the driving element is at least one of the plurality of guides.

15. A modular welding positioner, comprising:

a linear positioner;

a base, the linear positioner being positioned on the base, the base including:

spaced-apart guides positioned thereon, the guides being arranged so as to define both a circular path and a linear path, the linear positioner being secured between the spaced-apart guides and adapted to move linearly therebetween; and a driving element to move the linear positioner positioned on the base.

16. The modular welding positioner according to claim 15, wherein the linear positioner is moved linearly between the plurality of guides by the driving element.

17. The modular welding positioner according to claim 15, wherein the driving element is a gear configured to engage a mating gear of the linear positioner.

18. The modular welding positioner according to claim 17, wherein the base further includes a gate, the gate being pivotally connected to a sidewall of the base to allow the gear to engage and disengage the mating gear.

19. The modular welding positioner according to claim 15, wherein the driving element is at least one of the plurality of guides.

* * * * *